United States Patent [19]

Tanaka et al.

[11] Patent Number: 4,562,581
[45] Date of Patent: Dec. 31, 1985

[54] DIGITAL SIGNAL TRANSMITTING AND RECEIVING SYSTEM FOR SERIAL DATA WHICH CAN BE EASILY DECODED

[75] Inventors: Masato Tanaka, Tokyo; Tadashi Ohtsuki, Kanagawa; Yoshikazu Tsuchiya, Tokyo, all of Japan

[73] Assignee: Sony Corporation, Tokyo, Japan

[21] Appl. No.: 610,944

[22] Filed: May 17, 1984

Related U.S. Application Data

[63] Continuation of Ser. No. 378,408, May 14, 1982, abandoned, which is a continuation of Ser. No. 179,027, Aug. 18, 1980, abandoned.

[30] Foreign Application Priority Data

Aug. 20, 1979 [JP] Japan ............................ 54-105769

[51] Int. Cl.⁴ .............................................. H04L 7/04
[52] U.S. Cl. ........................................ 375/7; 375/113
[58] Field of Search ................... 375/7, 112, 113, 114, 375/116; 370/100, 101, 105; 358/148, 264; 371/42; 328/63, 72

[56] References Cited

U.S. PATENT DOCUMENTS

| | | | |
|---|---|---|---|
| 3,309,463 | 4/1963 | Roedl | 375/114 |
| 3,398,400 | 8/1968 | Rupp | 371/42 |
| 3,546,592 | 12/1970 | Mayo | 375/113 |
| 3,601,537 | 8/1971 | Gueldenpfenning | 375/113 |
| 3,651,263 | 3/1972 | Lindback | 375/114 |
| 4,017,684 | 4/1977 | Kurihara | 375/114 |
| 4,022,973 | 5/1977 | Stackhouse | 375/114 |
| 4,168,469 | 9/1979 | Parikh et al. | 375/114 |

FOREIGN PATENT DOCUMENTS

982326 2/1965 United Kingdom.
1476876 3/1975 United Kingdom.

OTHER PUBLICATIONS

Newnes-Butterworths, "Electronics Engineer Reference Book", 4th Edition, London, 1978, pp. 15.144–15.145.

Primary Examiner—Robert L. Griffin
Assistant Examiner—Stephen Chin
Attorney, Agent, or Firm—Hill, Van Santen, Steadman & Simpson

[57] ABSTRACT

A digital signal transmission system whereby the plural-bits-in-one-word digital signals are transmitted serially. According to this system, when the amount of data per unit time increases and the clock frequency of data is extremely high, a word synchronizing signal is input for each word so as to effect clock synchronization of data based on the word synchronizing signal, thereby allowing easy reading of each data bit. Detection can be facilitated by differentiating the format of the word synchronizing signal from that of the data clock signal, for example by varying the pulse period or pulse width. Further, by assembling a plural number of words into a block so that the block units are indicated with at least one bit in the words being signalled as a block flag bit, it becomes possible to treat the data in excess of the word units, allowing increase of the substantial bit number without increasing the bit number in one word.

15 Claims, 6 Drawing Figures

DIGITAL SIGNAL TRANSMITTING AND RECEIVING SYSTEM FOR SERIAL DATA WHICH CAN BE EASILY DECODED

This application is a continuation of application Ser. No. 378,408, filed May 14, 1982 which is a continuation of Ser. No. 179,027 filed Aug. 18, 1980 now both abandoned.

BACKGROUND OF THE INVENTION

1. Field of the Invention

This invention relates to a digital signal transmission system for transmitting serially the digital data signals with a large volume of information such as, for example, pulse-code modulated audio-signals.

2. Description of the Prior Art

Generally, when performing such operations as recording, playback, editing, etc., by converting the audio signals of music, etc., into PCM (pulse coded modulation), it is required to make data transmission between the plural units such as PCM recorder, electronic editing machine, specific effect generator such as a digital reverberator. In this case, it is undesirable to perform D-A convergence or A-D convergence for each unit because there takes place pulse-code modulation (PCM) due to signal deterioration upon every convergence to reduce the effect provided from an improvement of the S/N. Therefore, data transmission is conducted in the form of digital signals such as PCM signals.

Here, pulse-code modulation of audio signals of music, etc., is briefly explained. The analog signals which are continuous in time and amplitude, such as audio signals, are sampled by picking them up with a sampling pulse with a constant period and the amplitude of the sampled signals is changed into a debunching amplitude to effect so-called quantization, and the value of the quantized amplitude is encoded by, for example, binary code to form the PCM signals. For said sampling pulse, there is selected, for example 44 KHz or 50 KHz. According to said binary code, one sample is given with, for example, 16 bits per one word.

For parallel transmission of such digital signals (for example, parallel transmission of 16 bits of one word), it needs to connect 16 signal transmission lines such as twisted-pair transmission lines, and in case of transmitting the PCM audio signals of plural channels, for example 4 channels, it is required to connect as many as 64 signal transmission lines. This makes wiring of the transmitting and receiving terminals of the associated units very complicated and also tends to lower reliability of the connections.

If the digital signals such as PCM audio signals are transmitted serially with a single signal transmission line, the line connecting work is simplified and also its reliability is enhanced. In this case, generally the data reading clock signals are sent separately, but because of extremely large volume of information per unit time, the clock frequency for reading each bit in said data, even in the case of 16 bits in one word, is about 0.7 Mbit/sec. when the sampling frequency is 44 kHz and about 0.8 Mbit/sec. when the sampling frequency is 50 kHz. It is also required to provide in one word not only the audio signal data but also unit control bits or user's bits for free use by the user, so that it is desirable to adopt a 32-bits-in-one-word capacity to give full scope. In this case, if the sampling frequency is supposed to be 50 kHz, it is necessary to transmit digital signals of about 1.6 Mbit/sec., so that when clock synchronization is made between the transmitting and receiving sides, even about 100 m of transmission becomes impossible even if a deviation of half wavelength of the clock signals is permitted. Further, in case the data are reciprocated between the master units (such as electronic editing machine) and slave units (such as PCM recorder), the transmitting distance becomes even shorter substantially.

Out of the 32 bits in one word of such digital signal, for example 20 bits are assigned for sampling data and 12 bits for control, but such number of control bits may become insufficient in case the control information or user information has increased. If the number of bits in one word is increased, however, the bit clock frequency is further enhanced, and this necessitates speed-up of circuit response, making it difficult to effectuate clock synchronization.

OBJECT AND SUMMARY OF THE INVENTION

The present invention has been devised with the object of overcoming such problems, and it is intended to provide a digital signal transmission system which is a serial transmission system capable of eliminating complexity of wiring and preventing lowering of reliability inherent to the parallel transmission and according to which, even if the transmission distance is long, correct data reading is possible on the receiving side and also the volume of information per unit time is very great.

Another object of the present invention is to provide a digital signal transmission system according to which, even if control information or user information has increased, writing of such information can be duly made without increasing the number of control bits in one word and such information can be transmitted effectively.

BRIEF DESCRIPTION OF THE DRAWINGS

The drawings illustrate the embodiments of the present invention, in which.

DETAILED DESCRIPTION OF THE PREFERRED EMBODIMENTS

The present invention is described hereinbelow, with reference to the accompanying drawings, by way of the embodiments thereof where the invention was adapted for transmitting the digital signals which are the pulse-code modulated version of the audio signals of music, etc. For pulse-code modulation of the audio signals, they are sampled with a sampling frequency of 50.1 kHz and encoded with 20 bits, and 12 bits are added as control bits or user's bits to form the 32-bits-in-one-word digital signals.

Figure 1:
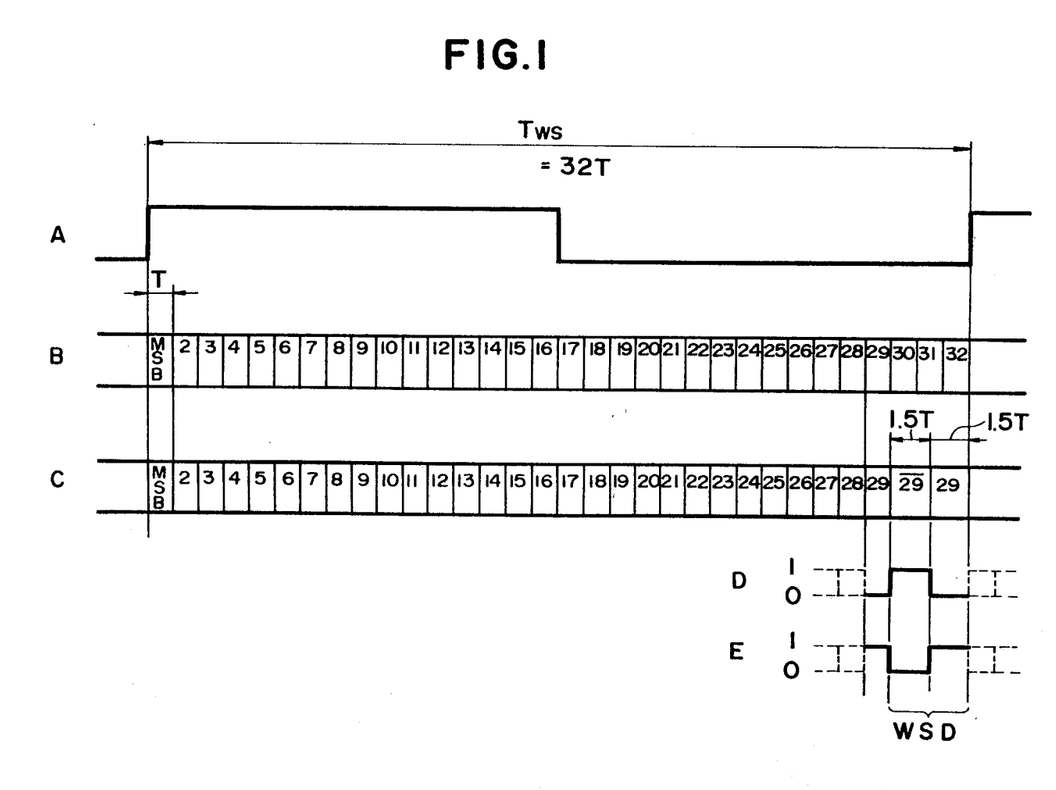
FIG. 1, A-E are the diagrams for illustrating the format of one word of a digital signal.

Referring first to FIG. 1, there is shown a diagram for illustrating the format of one word of a digital signal, where A shows a word sync signal with a duty of, for example, 50% for effecting word by word sychronization of the data, B shows the data of the 32 bits when one word slot is 32T (T is clock period of data), and C shows the data format of the digital signal used in this embodiment. The numerical figures in FIG. 1 are the bit numbers.

In FIG. 1, the period Tws of the word sync signal A is equal to the sampling period of the PCM audio signal, and it is about 20 usec. when the sampling frequency is 50.1 kHz. The unit time T of the data bits is given by dividing said word sync period Tws by 32, and out of these 32 bits in one word, 20 bits from the first bit MSB to 20th bit are used for said sampling data and the remaining 12 bits from 21st to 32nd bit are used as control bits or user's bits. In this embodiment, the three bits, or the 30th, 31st and 32nd bits, are used for the word sync signal in data (hereinafter referred to as WSD), forming a signal different in format from the data. For instance, as shown in FIG. 1, the bits from MSB to 29th bit (29SB) are formed into NRZ (non-return-to-zero) signals with unit time of T, and the succeeding three bits are divided in two to form NRZ signals with unit time of 1.5T, and the inverting (negative) data and non-inverting (positive) data of said 29th bit are arranged successively to provide said WSD signals. Therefore, when the data of the 29th bit is "0", there are provided the WSD signals in the order of "1" to "0" as shown in FIG. 1D, and when the 29th bit is "1", there are provided the WSD signals in the order of "0" to "1" as shown in FIG. 1E.

Figure 2:
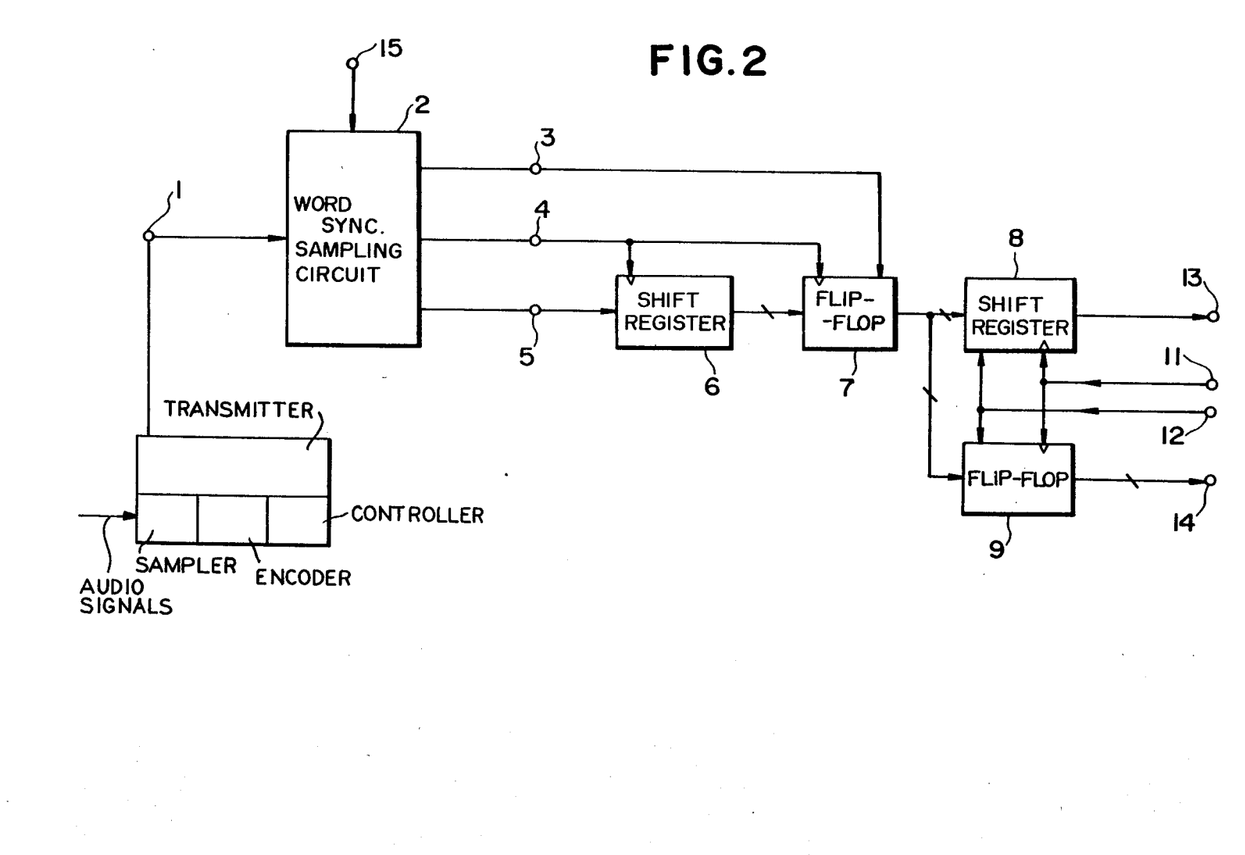
FIG. 2 is a block circuit diagram showing the input circuitries on the receiving side.

Such digital signals C are transmitted serially to the receiving system having the receiving circuitries (or input circuitries) such as shown in FIG. 2 through a single transmission line. In said receiving circuitries, said word sync signals are sampled and the respective data in one word are read based on the sampled word sync signals.

FIG. 2 illustrates the transmitting means which is connected to input terminal 1 and the transmitting means includes a means for sampling audio data which is supplied to the transmitting means and means for encoding the sample data and means for adding control and/or user bit signals to the encoded data.

Said WSD digital signals (C in FIG. 1) are sent to the input terminal 1 in FIG. 2, and the input digital signals are sent to a word sync sampling circuit 2. The word sync signals are taken out from the output terminal 3 of said word sync sampling circuit 2, the bit clock signals from the output terminal 4 and the serial data signals from the output terminal 5, respectively. The serial data signals from the output terminal 5 of said word sync sampling circuit 2 are sent to a serial-parallel converting type shift register 6 where said signals are made into the parallel data signals for every word and sent to a parallel type flip-flop 7. Sent to said shift register 6 and flip-flop 7 are the bit clock signals from the output terminal 4 of said word sync sampling circuit 2. In the circuitries down to said flip-flop 7, there are performed the operations by the word sync signals of said input digital signals and the corresponding clock signals, but after the data have been latched by said flip-flop 7, the signals are sent to the circuits operated by the internal clock signals on the receiving side or the word sync signals (fed to the input terminals 11 and 12, respectively), for example, a parallel-serial converting type shift register 8 or a parallel type flip-flop 9, allowing convenient signal processing on the receiving side. The shift register 8 operates to synchronize the parallel data for every word from the flip-flop 7 with the internal clocks on the reception side and convert them into the serial data of a format convenient for signal processing in the reception side units, and such serial data are issued out from the output terminal 13. The flip-flop 9 operates likewise to convert the data into the digital data suited for the internal processing by the reception side units and send them out from the output terminal 14. One of said shift register 8 and flip-flop 9 may be omitted. The word sync signals from the output terminal 3 of the word sync sampling circuit 2 are supplied to the clock enabling (clock inhibiting) terminal of the flip-flop 7 and operates to maintain the normal relation between the data for every word and bit order. Also, the high-rate clocks with n times as high frequency as the bit clocks (n being an integer of 5 or greater) are supplied to the word sync sampling circuit 2 via the terminal 15.

In case the signal transmission line is short because of the short inter-unit distance, the parallel type flip-flop 7 may be omitted and the parallel signals from the shift register 6 may be sent to the shift register 8 or flip-flop 9, and in such a case, said shift register 6 may be driven by the reception side clock signals from the clock input terminal 11.

Figure 3:
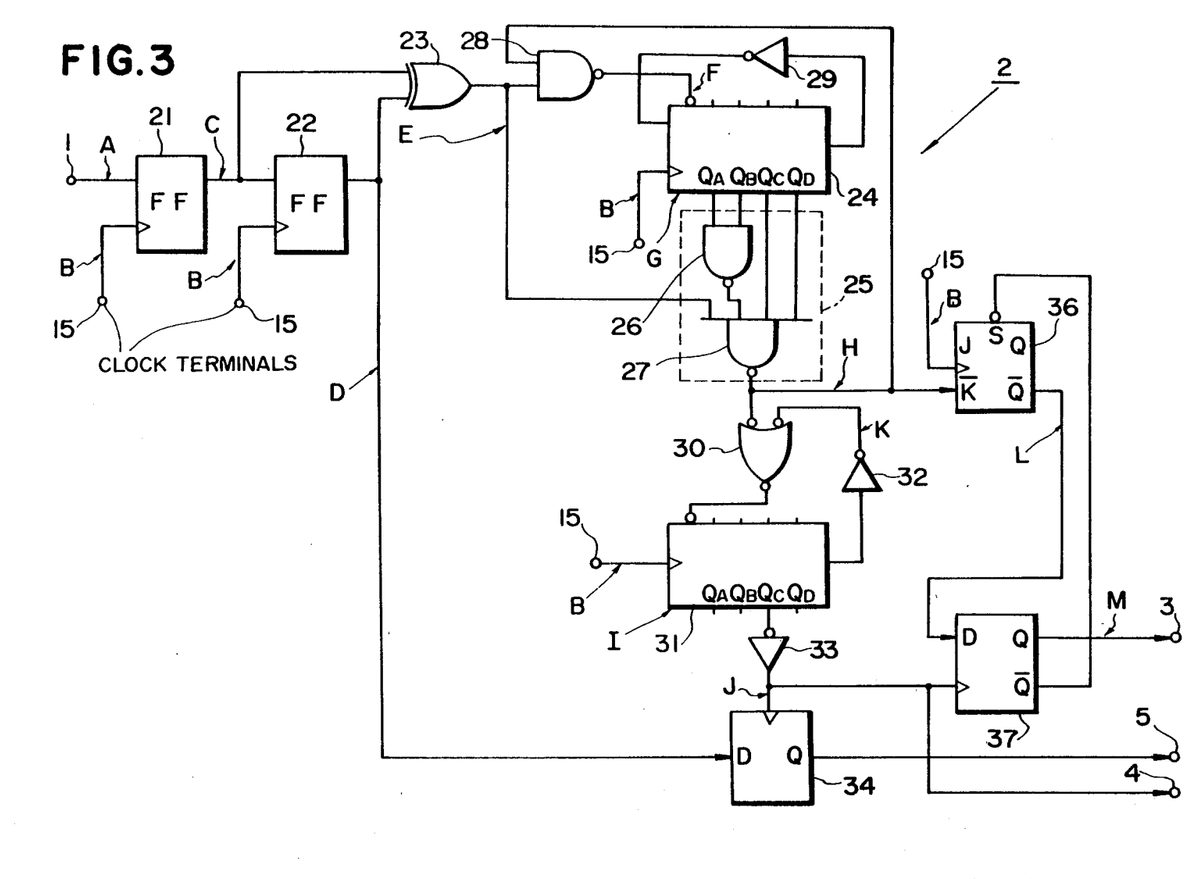
FIG. 3 is a block circuit diagram showing an embodiment of the word sync sampling circuit 2 in FIG. 2.
Figure 4:
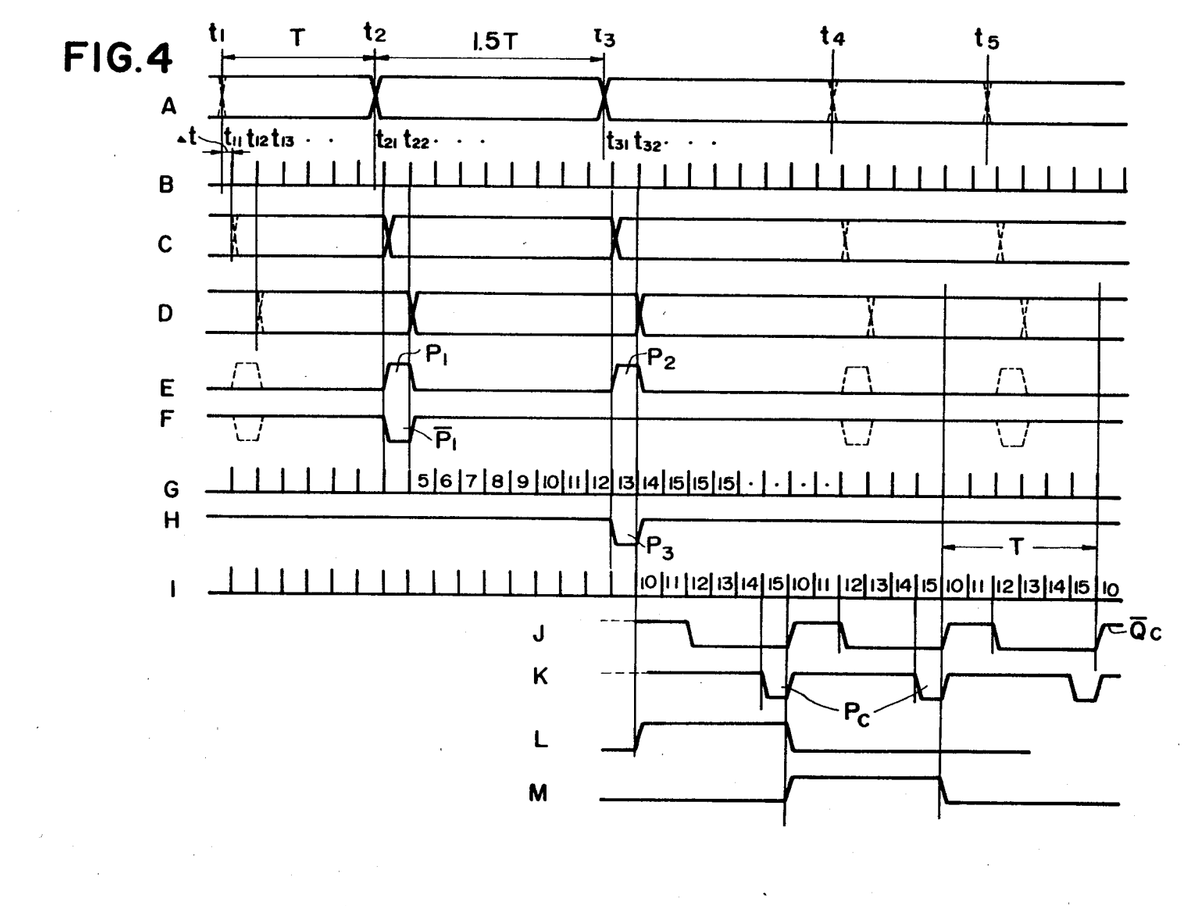
FIG. 4, A-M are the time charts showing the working waveforms at the points A-M, respectively, in FIG. 3.

Now, the concrete structure of the word sync sampling circuit 2 is described by way of an embodiment with reference to FIGS. 3 and 4. In the circuitries of FIG. 3, the digital signals such as shown by A in FIG. 4 are supplied to the input terminal 1. In the case of the digital data signals of FIG. 4A, the time span between time $t_1$ and $t_2$ form the unit time T of said data bits, and the signal is inverted at $t_2$ and $t_3$, and the time span between $t_2$ and $t_3$ forms the unit time of 1.5T. The data of the 29th bit in one word are placed between $t_1$ and $t_2$, and said WSD are inserted between $t_2$ and $t_3$ and between $t_3$ and $t_4$, $t_4$ being the time which as passed the unit time of 1.5T from the time $t_3$. Thus, next one word starts from time $t_4$ forward, and the data of MSB, 2SB, ... are arranged for every unit time T from time $t_4$.

Then the high-rate clock signals of a period of 1/n (n being an integer of 5 or greater) of said unit time T are supplied to the high-rate clock input terminal 15. Used in this embodiment are the high-rate clock signals with the period n of 6 (namely, T/6 period) as shown by B in FIG. 4. Regarding these high-rate clock signals B, the time at which the first clock pulse is generated after said time $t_1$ is given as $t_{11}$, and the times of occurrence of the succeeding clock pulses till said time $t_2$ are given as $t_{12}$, $t_{13}$, ..., successively. These clock pulses are usually six, but in case the distance $\Delta_t$ between times $t_1$ and $t_{11}$ is close to zero, there may be formed five or seven such clock pulses depending on the error between the input data and the reception side clocks or other factors. Also, the clock pulse occurrence times from $t_2$ to $t_3$ are given as $t_{21}$, $t_{22}$, ..., and similar timing is employed after time $t_3$ downward. The number of the clock pulses between $t_2$ and $t_3$ is usually nine and an error of $\pm 1$ is taken into consideration for the same reason as said above.

The digital data signals A (see FIG. 4) supplied to the input terminal 1 of FIG. 3 are sent to a D type flip-flop 21 driven by said high-rate clock signals B. This D type flip-flop 21, as is well known, operates to transfer the change of condition at the input terminal 1 to the Q output terminal according to the clock signals from the clock terminal 15, and the digital data signals A having an optional phase difference of $\Delta t$ relative to the high-rate clock signals B are turned into the digital data signals C synchronized with the high-rate clock signals B and having a phase difference of 0 (but there exists a slight delay time required for circuit response) and appear at said Q output terminal. Said digital data signal C is sent to the next D type flip-flop 22, and from the Q output terminal of said D type flip-flop 22 is obtained the digital data signal D which has been shifted by an amount of one period T/6 of said high-rate clock signal B. The Q outputs from said two D type flip-flops 21 and 22 are sent to an exclusive OR circuit (hereinafter referred to as Ex. Or circuit), forming the transient signals E (whether "1" and "0" are inverted or not) of said digital data signals. The input digital data signal A is inverted infallibly at $t_2$ and $t_3$, and said signal E has the transient pulses $P_1$ and $P_2$ between $t_{21}$ and $t_{22}$ and between $t_{31}$ and $t_{32}$, respectively. Usually nine high-rate clock pulses are contained between these transient pulses $P_1$ and $P_2$ (between time $t_{22}$ and $t_{32}$), and said WSB signals are discriminated by counting and detecting eight, nine and ten high-rate clock pulses by taking into consideration an error of ±1.

Thus, said WSD discrimination is made by a counter 24 and a logic matrix circuit 25 shown in FIG. 3. This counter 24 is a preset type hexadecinormal counter. 5 is taken as the presetting value and the presetting operation is performed according to the transient pulses $P_1$ of said signals E to successively count said high-rate clock pulses as shown by G in FIG. 4. The numerical figures of G in FIG. 4 are the values counted by the counter 24. The outputs $Q_A$, $Q_B$, $Q_C$ and $Q_D$ of the counter 24 correspond to the decimal numbers 1, 2, 4 and 8, respectively, and in the logic matrix circuit 25, NAND of $Q_A$ and $Q_B$ is given by an NAND circuit 26, and the output of said NAND circuit 26, $Q_C$, $Q_D$ and NAND of said signals E are given by the next NAND circuit 27 to form the output signals H. Thus, when the values counted by the counter 24 are 12, 13 and 14, all of $Q_A$, $Q_B$, $Q_C$ and $Q_D$ become "H", and if the transient pulses $P_2$ are produced in the signal E during this period, a WSD detection pulse $P_3$ is produced in the output signal H. This output signal H is sent to the load terminal for presetting of the next preset type hexadecinormal counter 31.

In order to prevent the counter 24 from being preset by the transient pulse $P_2$ of said signal E, the signal E is sent to the preset controlling load terminal of the counter 24 via the NAND circuit 28, and said ESD detection pulse $P_2$ is sent to said NAND circuit 28 to inhibit passage of said transient pulse $P_2$. Therefore, the inverted version of said transient pulse $P_1$ alone is contained in the output signal F from the NAND circuit 28.

Also, in the counter 24, a carrier pulse generated when counting 15 is sent to a clock input inhibiting control terminal (clock inable terminal) via an inverter 2, and the count is maintained at 15 until the presetting operation is started by the next transient pulse.

The counter 31 is designed to take out the bit clock signals for reading the data of each bit in one word. According to this device, the carrier pulse is inverted by an inverter 32 and then sent to the preset controlling load terminal via said OR circuit 30. It is utilized as a repetition counter whereby counting is repeated upon usually six times of counting of the high-rate clock pulse (the period becomes said unit time T). Out of the outputs $Q_A$, $Q_B$, $Q_C$ and $Q_D$ same as said above, $Q_C$ is taken out through the inverter 33.

Thus, when the WSD detection pulse $P_3$ of the output signal H is sent from the logic matrix circuit 25 to the load terminal of the counter 31 via the OR circuit 30, the preset value 10 is loaded and the pulses of the high-rate clock signals B are counted successively from said preset value 10 as shown by I in FIG. 4. The numerical figures of I in FIG. 4 are the values counted by the counter 31. When counting advances from 11 to 12, the output J from the inverter 33 falls, and when the counted value becomes 15, a carrier is produced and an inverted carrier pulse Pc is formed in the output signal K from the inverter 32. This pulse P is sent to said load terminal of the counter 31 via the OR circuit 30 and then 10 is preset. Therefore, when the counting has reached 15, counting is re-started from 10, and when the number is changed from 15 to 10, an output J rises up from the inverter 33. The similar operation is repeated with a period of six counts from 10 to 15 (unit time T of said data bits), and the time at which the output J rises up takes the central position of each data of said digital data signals D. This means that misread is minimized if each data of the digital data signal D is read at the time of rise-up of the bit clock output J. According to this system, for example the digital data signals D are sent to the D type flip-flop 34 and this D type flip-flop 34 is driven by said bit clock output J to send the Q output to said data output terminal 5.

Next, the word sync signals synchronized with said bit clock output J are obtained by using a J-K type flip-flop 36 and a D type flip-flop 37. According to these means, said WSD detection signal H is input (as K input) to the J-K type flip-flop 36 and its Q output (see L in FIG. 4) is sent to the D type flip-flop 37. If said bit clock output J is used as the clock of said D type flip-flop 37, the Q output becomes a word sync signal synchronized with the bit clock output J as shown by M in FIG. 4 and is sent to the terminal 3. The $\overline{Q}$ output of the D type flip-flop 37 is utilized as S output of the J-K type flip-flop 36.

Out of the thus read 32 bits in one word, those from MSB to 20th bit are used as sample data for audio signals and the remainder are used as control bits or user's bits, but the three bits, or 30th, 31st and 32nd bits, are used as WSD and the necessity of use for dubbing-inhibiting information bits or emphasis information bits from the remaining 9 bits is already ascertained, and hence the number of bits assigned for free use by the user is few.

Therefore, a plural number of bits are packed into a block and the control bits or user's bits in each word in one block are put to use for control data or for user's desired data, whereby the number of bits usable is greatly increased.

Figure 5:
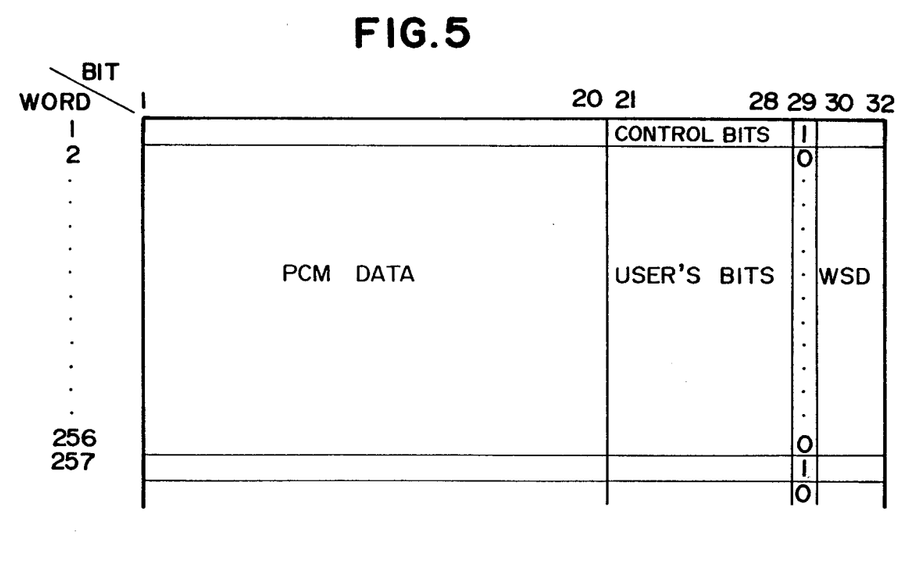
FIG. 5 is a mapping diagram for illustrating block formation of words.

For example, FIG. 5 shows a data map involving 256 words in one block, using the 29th bit in each word as block flag bit. In FIG. 5, the figures arranged on the horizontal axis show the bit numbers in each word and the figures on the vertical axis show the word numbers. Also, "1" and "0" of the 29th bit indicate the data values. The bits from the 21st to 28th bits in the first word are used as control bits and the bits from the 21st to 28th bits in each of the remaining 2nd to 256th words are used as user's bits. The block flag bit is "1" when the bits from 21st to 28th bit in one word are the control bits and "0" when they are the user's bits, and the word having the control bits is arranged at the top of the block. Therefore, the division of one block can be discriminated by reading said 29th bit for each word. When it is desired to increase the control bits, the 29th bit in each word, starting from the first word downward successively, is made "1". The reading rate of the control bits or user's bits when 256 words are packed in one block is 256 times the word sync period Tws, and it is approximately 5 msec when said sampling frequency is about 50 kHz. This indicates high availability as unit control data.

As apparent from the foregoing description, according to the digital signal transmission system of this invention, the word sync signals of each word of the plural-bits-in-one-word (for example 32-bits-in-one-word digital word signals are transmitted serially together with data signal through a single transmission line and said word sync signals are sampled on the reception side, and the respective data bits in one word are read based on the sampled word sync signals.

Thus, the system of this invention is capable of transmitting both data and word sync signals with a single transmission line, so that even if the transmission line is long, that is, even in case the distance between the transmission side units and the reception side units is long, the positional relation on the time axis of the respective data relative to the word sync signals remains unchanged to allow correct reading of data. Further, because of the serial transmission system, it is of course, possible to effectively prevent complication of connecting words or lowering of reliability such as seen in parallel transmission.

Another feature of this invention is that, in the digital signal transmission system having the above-said characteristics, it is possible to insert the word sync signals in one word of said digital signals and to distinguish such word sync signals from the data signals. This can be attained, for example, by using as word sync signals the pulses of a width distinguishable from the pulses used for expressing the respective data bits.

Figure 6:
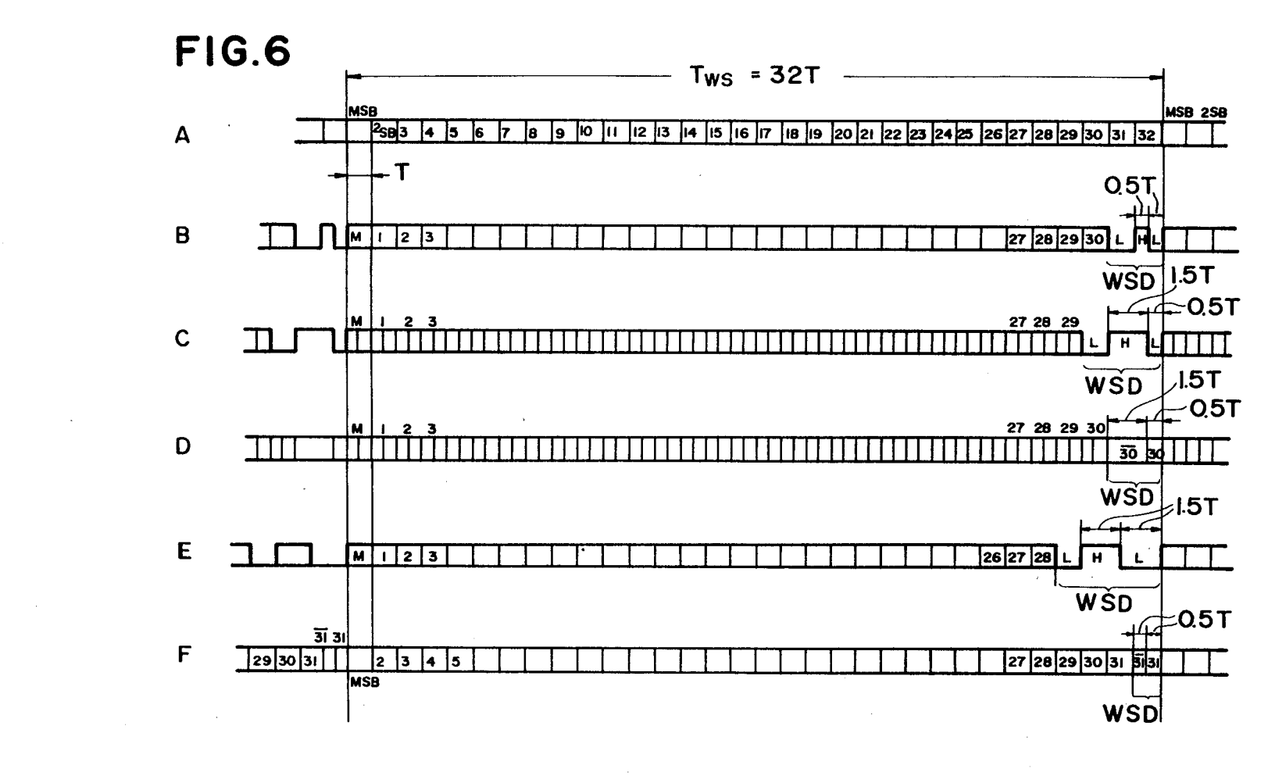
FIG. 6, A-F are diagrams showing the different embodiments of the format of one word.

Here, the word sync signals of a pulse width distinguishable from the data bit pulses are explained. In the above-described embodiment, NRZ signals with a period T are used as data signals and, because the pulse width is integral multiples of T, 2-bit NRZ signals with a pulse width of 1.5T are used as word sync signals, and these signals are inverted and non-inverted successively for the bits immediately before each word sync signal. It is also possible to use other various formats of word sync signals such as shown in FIG. 6. In the signal formats of FIG. 6, the word sync signals WSD are also inserted in the plural-bits-in-one-word digital signals (see A). In the case of this digital signal A, the unit time for one bit is T, but the pulse width may take other values than T depending on the expression method of data signals. For example, in case the data signals are expressed by NRZ (non return to zero), the pulse width takes integral multiples of T, so that the word sync signals WSD have a pulse width of other values than the integral multiples of T, such as 0.5T or 1.5T, as shown by B, E and F in FIG. 6. In the case of B in FIG. 6, the 31st bit is given as "L" and the 32nd bit is given as either "H" or "L" upon passage of every 0.5T period, thereby using these two bits as word sync signals WSD. In E, the 29th bit is given as "L" and the 30th, 31st and 32nd bits are divided in two, each being given as either "H" or "L" upon passage of every 1.5T period. This is the same as the case where the 29th bit is "0" in the above-described embodiment, but since the pattern is fixed, the word sync detection is greatly facilitated. In F of FIG. 6, the 32nd bit alone is used and the inversion and non-inversion signals of the 31st bit are arranged alternately at a period of 0.5T. In case of using PE signals or FM signals with a period of T as data signals, since the pulse width is either 0.5T or T, the word sync signals WSD may be formed by using the pulses with a width of 1.5T.

By using such word sync signals, it is made possible to transmit both data and word sync signals with a single transmission line, with the word sync signals being clearly distinguished from the data signals on the reception side, thus allowing correct reading of data by sampling the word sync signals.

The scope of use of the present invention is not limited to the above-said embodiments; the invention can be also easily applied to the transmission systems of not only pulse-code modulated audio signals but also other types of signals such as digitized versions of video signals. It is also possible to give in one word not only 32 bits but also any desired number of bits such as 16 bits, 24 bits, 64 bits, etc. Further, the word sync signals may be distinguished from the data signals not only by changing the pulse width but also by varying the phase or amplitude. Also, the position of the word sync signal in one word may be set at any number of bit provided that it is previously fixed and that it is possible to identify the positions of the respective data bits in one word from the fixed position of the word sync signal.

It will be apparent to those skilled in the art that many modifications and variations may be effected without departing from the spirit and scope of the novel concepts of the present invention.

We claim as our invention:

1. Apparatus for transmitting and receiving binary data in pulse-code-modulation of audio signals which are sampled at a sampling frequency higher than audio frequency and are encoded to form data words of a number of data bits and a number of control or user bits each within the time period T and including one or more word sync pulses of which at least one pulse has a time period of 0.5nT where "n" is an integer other than two comprising transmitting means for encoding and transmitting said data words, means receiving said data words from said transmitting means and comprising a word sync sampling circuit which receives said incoming data words and a high frequency clock signal input which has a frequency high enough to discriminate each time period 0.5nT and reproducing the word sync signal in data (WSD), a bit clock signal, and serial data signals, a first shift register receiving said bit clock signals and said serial data signals from said word sync sampling circuit and converting the data from serial to parallel form, a first flip-flop circuit receiving said parallel data from said first shift register and said word sync signal in data (WSD) and said bit clock signals from said word sync sampling circuit, a decoding means receiving the parallel data from said first flip-flop and receiving receiver generated clock signals and said decoding means producing output serial data words synchronized with said generator clock signals.

2. Apparatus for transmitting and receiving binary data according to claim 1 wherein said decoding means is a second shift register.

3. Apparatus for transmitting and receiving binary data according to claim 1 wherein said decoding means is a second flip-flop circuit.

4. Apparatus for receiving binary data according to claim 1 wherein said word sync sampling circuit comprises, a second flip-flop which receives said incoming data word signals, a third flip-flop which receives the output of said second flip-flop, said second and third flip-flops receiving said high frequency clock signal, a first exclusive OR gate receiving the outputs of said second and third flip-flops, a first counter receiving the output of said first exclusive OR gate, a logic matrix circuit receiving the outputs of said first counter and the output of said first exclusive OR gate, a second counter receiving the output of said logic matrix circuit, a fourth flip-flop receiving the outputs of said second counter and said third flip-flop and producing said serial data signals, an output of said second counter comprising said bit clock signals, and a fifth flip-flop receiving an output of said second counter and supplying said word sync signal (WSD) as an output.

5. Apparatus according to claim 4 including a sixth flip-flop receiving an output of said logic matrix circuit and said high frequency clock signal and supplying an output to said fifth flip-flop.

6. Apparatus according to claim 4 including an OR gate connected between said logic matrix circuit and said second counter and OR gate receiving an output of said second counter.

7. A digital signal transmission system for encoded audio signals comprising: binary data transmitter means including means for sampling audio signals, means for encoding the output of said sampling means to form data bits representing said encoded audio signals, means to form data words each of which comprises said data bits, control or user bits and a word sync signal, each of said bits having a time period T and each of said word sync signals comprising pulses of which at least one in each said word sync signal has a time period of 0.5nt where n is an integer other than two, and means to assemble said data words into blocks of said data words to identify said blocks; and receiver means for receiving said data blocks from said transmitter means and including a word sync sampling circuit which receives said incoming data words and a clock signal of frequency sufficiently high to discriminate each said pulse of time period 0.5nt, and which reproduces said word sync signals, a bit clock signal synchronized with said word sync signals, and serial data signals and wherein said word sync sampling circuit comprises a first flip-flop which receives said incoming data word signals, a second flip flop which receives the output of said first flip flop, said first and second flip flops receiving said clock signal, an exclusive OR gate receiving the outputs of said first and second flip flops, a first counter receiving the output of said exclusive OR gate, a logic matrix circuit receiving the outputs of said exclusive OR gate and said first counter, a second counter receiving the output of said logic matrix circuit, a third flip flop receiving the outputs of said second counter and said second flip flop and producing serial data signals, an output of said second counter comprising said clock signal, and a fourth flip flop receiving an output of said second counter and supplying said word sync signals as an output.

8. A digital signal transmission system according to claim 7 wherein said receiver means further includes means for converting said serial data signals from serial to parallel data form.

9. A digital signal transmission system according to claim 8 wherein said receiver means comprises means for receiving said parallel data and receiver generated clock signals, and for producing output serial data words synchronized with said receiver generated clock signals.

10. Apparatus for transmitting and receiving binary date in the form of data words, each of which comprises data bits representing pulse code modulated audio signals, control or user bits, and a word sync signal, each of said bits having a time period T and each of said word sync signals comprising pulses of which at least one in each said word sync signal has a time period of 0.5nt where n is an integer other than two, the apparatus comprising transmitter means for encoding and transmitting said data words, receiver means for receiving said data words from said transmitter means and comprising a word sync sampling circuit which receives said incoming data words and a clock signal of frequency sufficiently high to discriminate each said pulse of time period 0.5nt, and which reproduces said word sync signals, a bit clock signal synchronized with said word sync signals, and serial data signals, a first shift register for receiving said bit clock signals and said serial data signals from said word sync sampling circuit and converting the data from serial to parallel form, a first flip-flop circuit for receiving said parallel data from said first shift register, and said word sync signal and said bit clock signals from said word sync sampling circuit, and decoder means for receiving said parallel data from said first flip-flop circuit and receiving receiver generated clock signals, said decoder means producing output serial data words synchronized with said receiver generated clock signals.

11. Apparatus according to claim 10 wherein said decoder means comprises a second shift register.

12. Apparatus according to claim 10 wherein said decoder means comprises a second flip-flop circuit.

13. Apparatus according to claim 10 wherein said word sync sampling circuit comprises a third flip-flop for receiving said incoming data word signals, a fourth flip-flop for receiving the output of said third flip-flop, said third and fourth flip-flops receiving said high frequency clock signal, exclusive OR circuit for receiving the outputs of said third and fourth flip-flops, a first counter for receiving the output of said exclusive OR circuit, a logic matrix circuit for receiving the outputs of said first counter and the output of said exclusive OR circuit, a second counter for receiving the output of said logic matrix circuit, a fifth flip-flop for receiving the outputs of said second counter and said fourth flip-flop and for producing said serial data signals, an output of said second counter comprising said bit clock signals, and a sixth flip-flop for receiving an output of said second counter and for supplying said word sync signal as an output.

14. Apparatus according to claim 13 comprising a seventh flip-flop for receiving an output of said logic matrix circuit and said high frequency clock signal and supplying an output to said sixth flip-flop.

15. Apparatus according to claim 13 comprising an OR circuit connected between said logic matrix circuit and said second counter, said OR circuit receiving an output of said second counter.

* * * * *